(12) United States Patent
Hunter et al.

(10) Patent No.: US 8,425,119 B2
(45) Date of Patent: Apr. 23, 2013

(54) GAS BEARINGS

(75) Inventors: Stephen Paul Hunter, Bristol (GB);
Hugo George Derrick, Bristol (GB);
Geoffrey McFarland,
Wotton-under-Edge (GB); David Roberts McMurtry, Dursley (GB)

(73) Assignee: Renishaw PLC, Wotton-under-Edge (GB)

( * ) Notice: Subject to any disclaimer, the term of this patent is extended or adjusted under 35 U.S.C. 154(b) by 1077 days.

(21) Appl. No.: 12/308,704

(22) PCT Filed: Jun. 26, 2007

(86) PCT No.: PCT/GB2007/002379
§ 371 (c)(1),
(2), (4) Date: Dec. 22, 2008

(87) PCT Pub. No.: WO2008/001069
PCT Pub. Date: Jan. 3, 2008

(65) Prior Publication Data
US 2009/0279815 A1    Nov. 12, 2009

(30) Foreign Application Priority Data

Jun. 30, 2006 (GB) .................................. 0612980.3

(51) Int. Cl.
*F16C 32/06* (2006.01)
(52) U.S. Cl.
USPC ........................................................ 384/109
(58) Field of Classification Search .................. 384/100, 384/107–124, 261–269
See application file for complete search history.

(56) References Cited

U.S. PATENT DOCUMENTS

| | | | |
|---|---|---|---|
| 2,452,965 A | 11/1948 | Sulprizio | |
| 3,408,043 A | 10/1968 | Williams et al. | |
| 3,586,397 A * | 6/1971 | Dee ............................. | 384/119 |
| 5,019,738 A | 5/1991 | Weilbach et al. | |
| 5,689,146 A | 11/1997 | Cheever | |
| 5,883,453 A | 3/1999 | Choi | |
| 6,119,348 A | 9/2000 | Jennings et al. | |
| 6,702,350 B1 * | 3/2004 | Gorniak ......................... | 295/43 |
| 2004/0206159 A1 | 10/2004 | Neumann | |

FOREIGN PATENT DOCUMENTS

| | | |
|---|---|---|
| DE | 268 497 A1 | 5/1989 |
| DE | 195 22 109 A1 | 1/1997 |
| GB | 151 905 | 10/1920 |
| GB | 1 232 860 | 5/1971 |
| GB | 1 262 852 | 2/1972 |
| GB | 2 194 603 | 3/1988 |
| GB | 2 263 949 A | 8/1993 |

* cited by examiner

Primary Examiner — Thomas R Hannon
(74) Attorney, Agent, or Firm — Oliff & Berridge, PLC

(57) ABSTRACT

A rotary gas bearing is described that comprises a first part rotatable relative to a second part. The first part comprises a support member and a first portion and a second portion attached to the support member. The first portion comprises a first bearing surface and the second portion comprising a second bearing surface. Both the first portion and the second portion are attached to the support member by screw thread connections. The second part may comprise complimentary bearing surfaces. Epoxy may be used to fix the first and/or second portions to the support member. A method of determining the bearing working gap by measuring gas flow through the bearing is also described.

14 Claims, 4 Drawing Sheets

GAS BEARINGS

Figure 1:
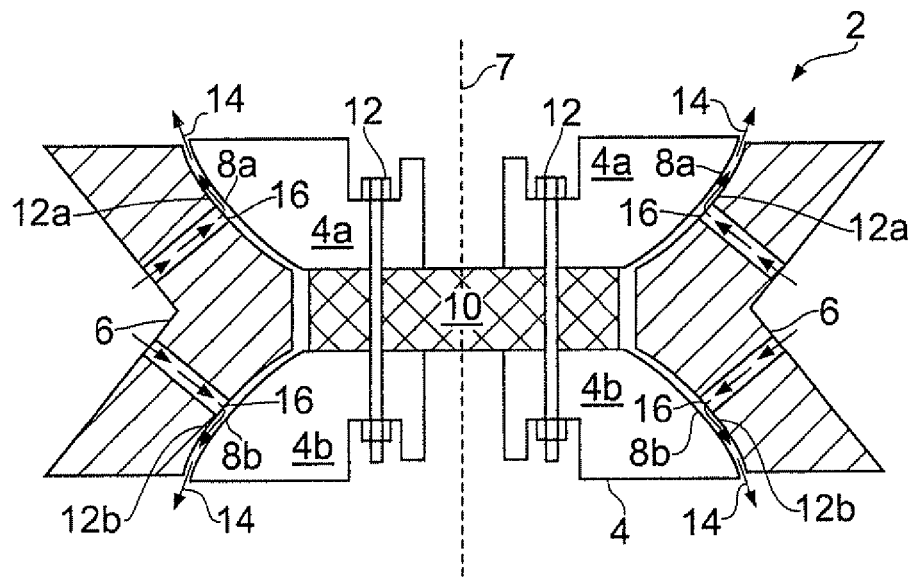

The present invention relates to gas bearings and a method of setting such bearings. In particular, the invention relates to rotary air bearings for use in metrology apparatus and the like.

Rotary gas bearings are known and typically comprise a rotor that is rotatable relative to a stator. Under typical running conditions, there is no solid-to-solid contact between the stator and the rotor. Instead, a film of pressurised gas, typically air, forms a layer or air cushion between the bearing surfaces of the rotor and the stator and serves to transfer any load from one element to the other. Since air bearings are non-contact, they avoid the traditional bearing-related problems of friction, wear, and the need for a lubricant. Air bearings are particularly advantageous in precision positioning and high-speed applications.

GB1232860 describes an example of a known air bearing which comprises a rotor and a stator. The rotor has upper and lower rotor portions that are bolted together and separated by a spacer element. The spacer element has a thickness that is carefully selected to provide the required separation between the upper and lower rotor portions to provide the required working gap between the bearing surfaces of the rotor and the stator.

GB151905 describes a gas lubricated bearing having a stationary element that comprises a casing or bearing member formed from two opposed conical bearing surfaces. A rotary element is also provided that includes two conical bearing members mounted on a solid shaft. One of the bearing members is attached to the shaft by a screw thread and the other bearing member is rigidly fixed or slidably mounted to the shaft. In use, a layer of pressurised gas separates the bearing surfaces of the stationary element from those of the rotary element.

According to a first aspect of the invention, a rotary gas bearing comprises a first part rotatable relative to a second part, the first part comprising; a support member; a first portion attached to the support member, the first portion comprising a first bearing surface; and a second portion attached to the support member, the second portion comprising a second bearing surface; wherein both the first portion and the second portion are attached to the support member by screw thread connections.

The present invention thus provides a gas bearing having a first part that can be rotated relative to a second part. In use, there is preferably no direct physical contact between the first and second parts of the gas bearing. Instead, the first and second bearing surfaces of the first part are separated from the complimentary bearing surfaces of the second part by a working gap in which there is provided a layer of gas, such as an air cushion provided by a flow of air. Any load is thus transmitted from the first part to the second part of the bearing via the gas layer(s).

In order to provide efficient gas bearing operation, the working gap between the bearing surfaces of the first part and the second part needs to be within a certain range. To set the working gap, the separation between the first bearing surface and the second bearing surface of the first part can be altered by moving the first and/or second portion along the support member using a screw action. A bearing of the present invention can thus be seen to include bearing setting means that are an integral part of the first part of the bearing and which allow the separation between the first and second bearing surfaces of the first part to be selectively adjusted as required. In other words, the relative position of the first bearing surface relative to the second bearing surface can be varied which in turn sets the working gap between the bearing surfaces of the first and second parts.

Providing such integral bearing setting means obviates the need to provide carefully machined spacer elements of the type described in GB1232860. It also permits the first and/or second parts of the bearing to be formed with lower tolerances because any difference in surface separation can be corrected during the bearing setting process. The present invention can thus provide lower cost, improved performance, air bearings compared with those described previously in GB1232860.

In addition, the provision of first and second portions that are both attached to the support member by a screw thread connection is advantageous over bearings of the type described in GB151905 in which only a single cone shape bearing member is attached to a shaft by a screw-thread. In particular, attaching both first and second portions to a support member using a screw thread provides a solid and stable means of attachment that provides "metal-to-metal" contact via the screw threads. This arrangement allows the first and second portions to be reliably and robustly attached to the support member in well defined positions without introducing any significant distortions thereof. The bearing of the present invention thus provides greater control over, and better stability of, the bearing working gap than is possible with bearings of the type described in GB151905. Advantageously, the first portion and/or the second portion are substantially annular and comprise a central aperture having a threaded wall for engaging a complimentary thread of the support member. In other words, the first portion and/or the second portion may comprise an opening having an inner threaded surface that can be screwed onto a support member. Conveniently, the threaded surface comprises a fine thread. The first and second bearing surfaces may be located radially outwardly from the threaded surface. Advantageously, each of the first and second portions are formed as a single unit or piece (i.e. as an integral component).

Advantageously, means are provided for permanently fixing the separation between the first bearing surface and the second bearing surface after the separation has been adjusted. This may be achieved by providing means for immobilising the first portion and the second portion relative to the support member. In other words, once the separation between the first bearing surface and the second bearing surface has been adjusted, the relative position of the surfaces may be locked into place. Such fixing may be provide by locking screws or similar means.

Advantageously, an adhesive (e.g. epoxy) is used to permanently set the working gap by fixing the position of the first portion and/or the second portion relative to the support member. Any such adhesive may be coated on one or more sections of the screw thread prior to adjustment of the working gap. Conveniently, the epoxy is coated on the screw threads of the first and/or second portions and/or the support member prior to assembly. Advantageously, a slow cure epoxy is used to allow the working gap of the bearing to be adjusted prior to curing. It should be noted that using an epoxy in combination with a screw thread connection provides a strong and durable joint. The "metal-to-metal" contact of the complimentary screw threads provides high accuracy, substantially invariant, mounting of the first and/or second portion to the support member whilst the adhesive fills the gaps in the screw thread that are not in direct contact with each other. In this manner the screw thread connection is locked with only a minimal amount of adhesive being located in the load path of the screw thread connection.

The second part of the bearing conveniently comprises one or more additional bearing surfaces that are complimentary to the first and second bearing surfaces of the first part. The bearing may comprise any type of rotary bearing, including a thrust bearing, in which a first part is rotatable relative to the second part. In such an arrangement, the first and second bearing surfaces of the first part and the one or more additional bearing surfaces of the second part may take the form of annular discs.

To provide efficient gas bearing operation, the bearing preferably comprises means for providing a gas cushion between the bearing surfaces of the first part and the second part. For example, means may be provided for pumping a gas (e.g. air) into the gap between the bearing surfaces of the first part and the second part.

The gas may be introduced in to the gap via apertures formed in one or more of the bearing surfaces. Advantageously, the one or more additional bearing surfaces comprise at least one, and preferably a plurality, of apertures through which gas can be passed. Similarly, at least one of the first bearing surface and the second bearing surface may comprise at least one, and preferably a plurality, of apertures through which gas can be passed. Alternatively, the bearing may be configured to suck gas into the gap.

Conveniently, the support member comprises a shaft having a substantially circular cross-section. Preferably, the shaft comprises a hollow core. In other words, the support member may comprise a tube.

Advantageously, the first and second parts of a rotary bearing of the present invention enclose, at least in part, a motor assembly. The motor assembly may be arranged to provide relative rotational motion between the first and second parts of the bearing thereby providing a compact motorised bearing assembly. Conveniently, the motor assembly is located, at least in part, within a hollow core of the bearing shaft. Advantageously, the motor is located at a position along the shaft that is midway between the first and second portions. Locating the motor at the midpoint minimises the loading that is induced into the bearing by the magnets of the motor thereby minimising motor induced bearing swash. It should be noted that such an motorised arrangement is typically not possible with bearings of the type described in GB1232860 that use central spacer elements to set the separation between rotor bearing surfaces.

Any gas flow used to produce an air cushion between the first and second parts may also be used for other purposes. For example, such gas flow may be used to control the temperature of a part of the bearing or of a structure in or to which the bearing is mounted. The gas flow may thus be used to cool (and/or heat) parts of the bearing or other associated components. For example, the gas that has passed between the bearing surfaces of the first part and the second part may conveniently be passed to the motor assembly. In such an example, the support member may comprise one or more apertures through which the gas is channelled to an associated (e.g. enclosed) motor assembly. Such an arrangement allows motor cooling to be achieved. Maintaining the temperature of the bearing and/or associated structures by such gas cooling (and/or heating) is particularly important for metrology applications where thermal expansion effects can degrade measurement accuracy.

The first part of the bearing may form the rotor or the stator. By analogy with the terminology used to describe electric motors, the term rotor is used herein to mean the part of the bearing which rotates during use whilst the term stator is used to describe the stationary part of the bearing. The first part may thus advantageously comprise the rotor and the second part tlie stator. In such an arrangement, the first and second bearing surfaces may be arranged to face each other. The second part of the bearing (the stator) may then be located at an axial location along the support member of the rotor which is between the first and second portions. Alternatively, the first part of the bearing conveniently comprises the stator and the second part of the bearing comprises the rotor.

Advantageously, the bearing surfaces of the stator comprise one or more apertures through which gas can be passed. Providing the gas apertures on the non-rotating bearing surfaces of the stator reduces the complexity of injecting gas into the working gap. The stator may also comprise a hollow channel or cavity into which pressurised gas can be injected. Gas may then be expelled from the stator cavity into the working gap between the stator and rotor bearing surfaces via the aforementioned apertures. As noted above, the stator may be the first part or the second part of the bearing.

Advantageously, the first bearing surface has one of a conical shape, a convex shape, a concave shape and a substantially flat shape. Conveniently, the second bearing surface has one of a conical shape, a convex shape, a concave shape and a substantially flat shape. Conveniently, the first and/or second bearing surface are spherically shaped (e.g. the bearing surfaces may lie on a truncated section through a sphere). The first and second bearing surfaces may have similar or different shapes. The first and second bearing surface shapes may have mirror symmetry. The first part of the bearing may also comprise further bearing surfaces; e.g. a third bearing surface, a fourth bearing surface etc. Such further bearing surfaces may be provided on the first and second portions or on further portions attached to the support member. It should be noted that providing first and second portions that are attached to a support member (rather than being formed integrally with such a support member) allows such portions to be manufactured to a high accuracy by a lapping or similar process.

As outlined above, the second part of the bearing (e.g. the stator) comprises additional bearing surfaces which are complimentary to the first and second bearing surfaces of the first part of the bearing (e.g. the rotor). The shape of the bearing surfaces of the first part are thus arranged to match the shape of the bearing surfaces of the second part. Moreover, it is preferred that the bearing surfaces of the first and second parts are arranged such that a substantially constant working gap is provided therebetween.

Advantageously, the bearing is arranged such that any thermal expansion of the first and second parts does not substantially affect the working gap. For example, the angles of the bearing surfaces of the rotor and stator may be set such that, for a given separation of the first and second portions and support structure diameter, any differential thermal expansion effects do not significantly change the working gap.

The bearing may be formed from any material or any combination of materials; for example, the bearing may comprise metal. Conveniently, the support member and/or the first and second portions are formed from Aluminium or an Aluminium alloy. A toughened surface coating (e.g. an anodised layer) of the Aluminium may provide the bearing surface. Aluminium has the advantages of being light and can be easily formed (e.g. machined) to provide the necessary component configuration.

Metrology apparatus may advantageously be provided which comprises a bearing of the type described above. The metrology apparatus may comprise a co-ordinate measuring machine (CMM) or other suitable co-ordinate positioning apparatus such as a machine tool etc. The metrology apparatus may advantageously comprise an articulating probe head.

According to a second aspect of the invention, a method of setting a gas bearing comprises the steps of; (i) taking a gas bearing having a first bearing surface moveable relative to a complimentary bearing surface, (ii) adjusting the working gap between the first bearing surface and the complimentary bearing surface; and (iii) providing pressurised gas flow between the first bearing surface and the complimentary bearing surface, wherein the method comprises the step of measuring the flow rate of the gas provided in step (iii) to provide an indication of the working gap.

The present invention thus provides a technique for bearing setting which involves measuring the flow rate of gas through the gas bearing. The working gap between opposed bearing surfaces can thus be determined from the measured gas flow rate. Such a technique can be easily implemented during the bearing manufacture process and does not involve taking precision measurements or ensuring bearing parts are manufactured to very high tolerances to obtain high levels of bearing accuracy.

Advantageously, steps (ii) and (iii) are repeated in sequence until a predetermined flow rate of gas between the first bearing surface and the complimentary bearing surface is attained. The predetermined flow rate associated with a certain working gap may be calculated theoretically or experimentally. Conveniently, the gas flow is stopped during step (ii) to allow bearing adjustment. Once the predetermined flow rate of gas has been attained, the method conveniently comprises the step of fixing the working gap. Advantageously, the working gap is fixed using an adhesive such as an epoxy. Conveniently, the working gap is fixed (e.g. the glue is allowed to cure) whilst the pressurised gas flow is activated. Preferably, a slow cure adhesive is used which exhibits minimal shrinkage whilst curing; "slow" being defined relative to the time required to appropriately adjust the working gap of the bearing.

The above described bearing setting method may advantageously be used to set a bearing of the first aspect of the invention. For example, step (i) may conveniently comprise taking a bearing according to the first aspect of the invention. Step (ii) may then advantageously comprise axially moving at least one of the first portion and the second portion along the support member. In this manner, the adjustment step (ii) may be performed by screwing the first and/or second portions into the required position along the shaft.

Although the gas bearing could be operated using any type of gas, step (iii) preferably comprises providing a flow of air. Compressed air supplies are typically readily available in machine environments and the like.

Although the gas flow rate method described above may be used to set the working gap of a bearing according to the first aspect of the invention, such a bearing may alternatively be set using any one of a number of known prior art techniques. For example, the height of the rotor relative to the bearing structure may be measured whilst the bearing is running (i.e. air flow on) and when stopped (i.e. air flow off). The difference in rotor height between these two measurements provides a measure of the working gap.

Also described herein is a rotary gas bearing that comprises a first part moveable relative to a second part, the first part comprising a first bearing surface and a second bearing surface, the second part comprising one or more additional bearing surfaces complimentary to the first bearing surface and the second bearing surface, the bearing also comprising bearing setting means for setting the separation between the first bearing surface and the second bearing surface, wherein the bearing setting means is integral with the first part of the bearing and allows the separation between the first bearing surface and the second bearing surface to be selectively adjusted.

Figure 2:
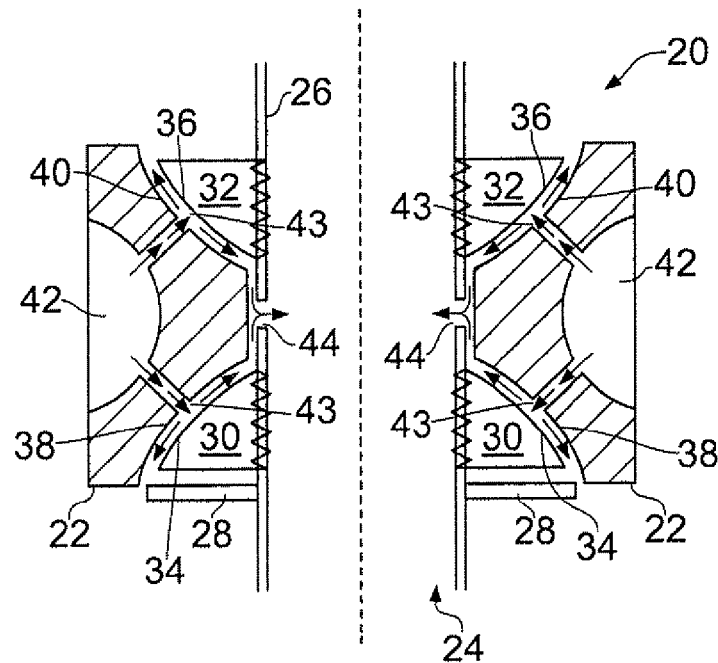
Figure 3:
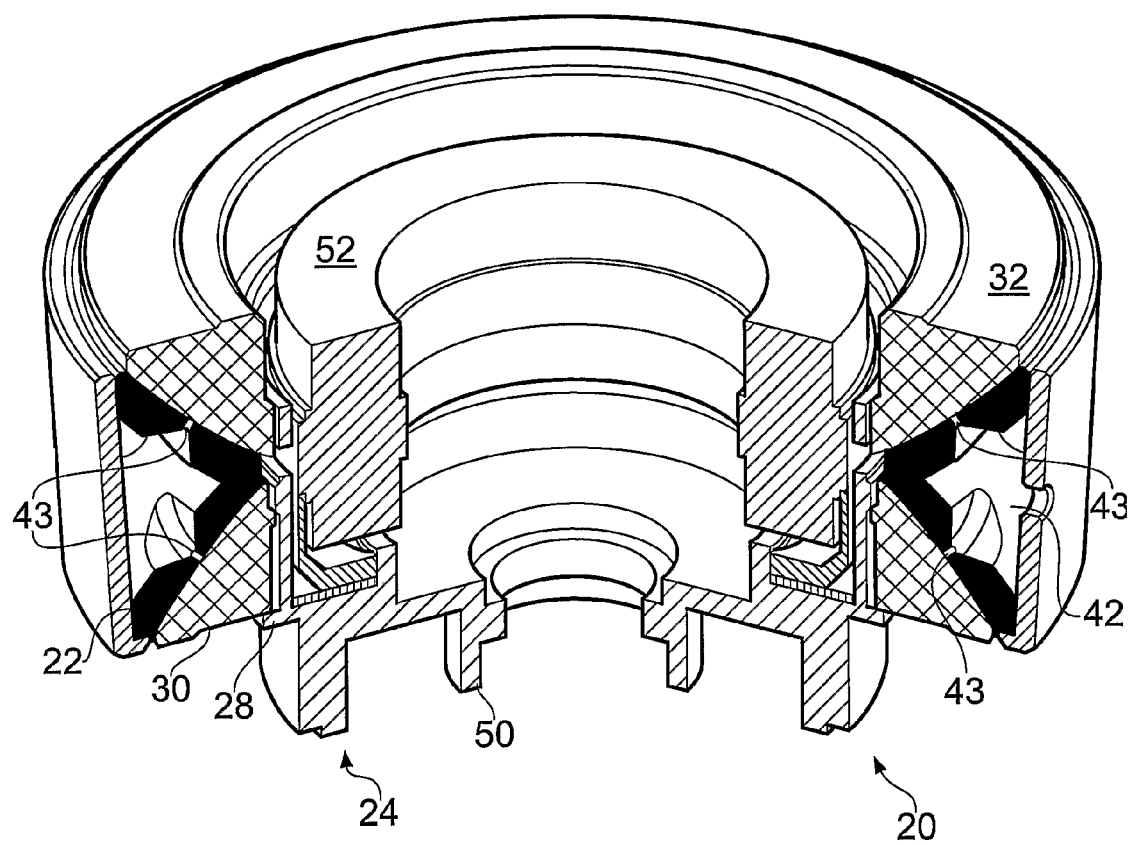
Figure 4A:
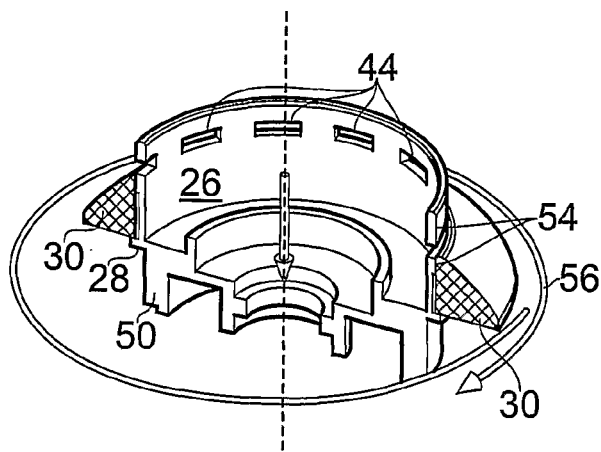
Figure 4B:
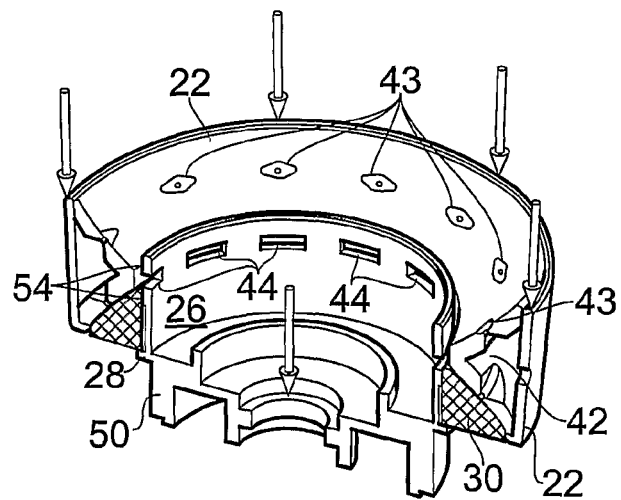
Figure 4C:
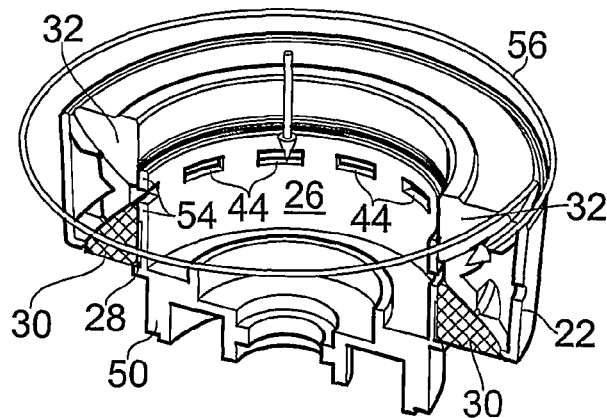
Figure 5:
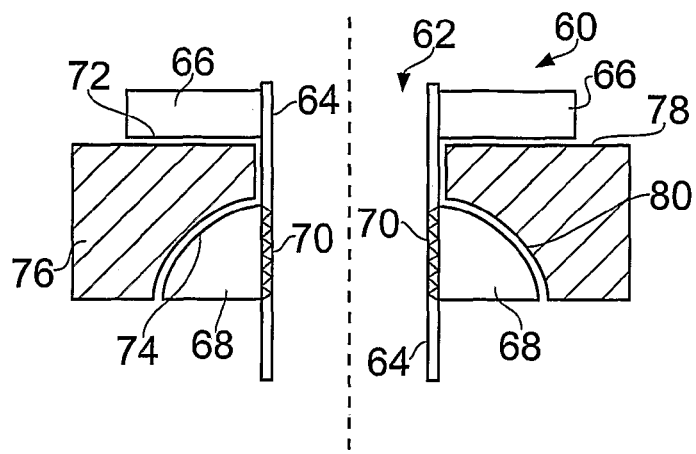
Figure 6:
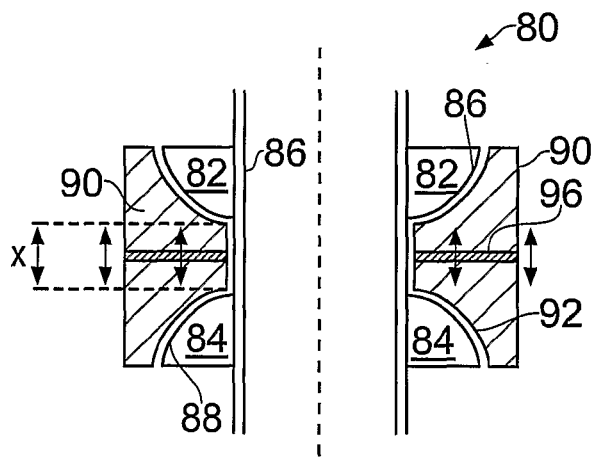
Figure 7:
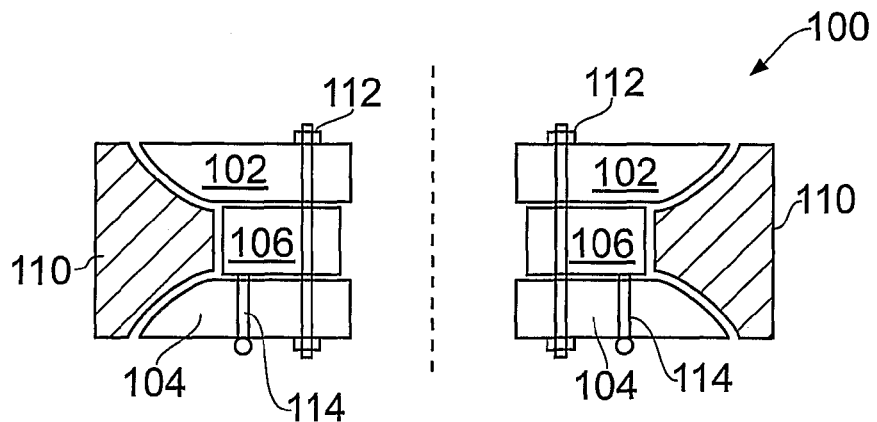

The invention will now be described, by way of example only, with reference to the accompanying drawings in which;

FIG. 1 illustrates a prior art air bearing assembly,

FIG. 2 is a cross-sectional view of a first air bearing of the present invention, FIG. 3 shows in detail an assembled air bearing of the type shown in FIG. 2, FIG. 4 illustrates a method of assembling an air bearing of the type shown in FIG. 3, FIG. 5 is a cross-sectional view of a second air bearing of the present invention, FIG. 6 is a cross-sectional view of a third air bearing of the present invention, and FIG. 7 is a cross-sectional view of a fourth air bearing of the present invention.

Referring to FIG. 1, a cross-sectional view through an air bearing 2 of the type described in GB1232860 is shown. The air bearing 2 comprises an annular rotor 4 which is rotatable relative to a stator 6 about axis of rotation 7.

The rotor 4 comprises an upper rotor portion 4a and a lower rotor portion 4b. The upper rotor portion 4a has a first bearing surface 8a and the lower rotor portion 4b has a second bearing surface 8b. The upper rotor portion 4a is spaced apart from the lower rotor portion 4b by a spacer element 10. Screws 12 are threaded though the upper rotor portion 4a, lower rotor portion 4b and the spacer element 10 to maintain these elements in a fixed space relation.

The stator 6 has a first bearing surface 12a and second bearing surface 12b. Cavities within the stator 6 terminate at apertures 16 formed in the first and second bearing surfaces 12a and 12b. The first and second bearing surfaces 8a and 8b of the rotor 4 are arranged to have a complimentary shape to the corresponding first and second bearing surfaces 12a and 12b of the stator 6. The thickness of the spacer element 10 is carefully selected so that the rideheight or working gap between the bearing surfaces of the rotor and the stator provides proper air bearing operation.

In use, air is pumped into the cavities of the stator and such air exits through the apertures 16. The air exits the apertures 16 and flows out of the bearing in the direction marked by arrows 14 in FIG. 1. The bearing thus comprises a central air-gap region that is pressurised and peripheral air-gap areas through which there is a flow of air during use.

A prior art bearing of the type shown in FIG. 1 has a number of disadvantages. For example, the thickness of the spacer element 10 is crucial to efficient device operation. Having too thin a spacer element reduces the working gap between the bearing surfaces thereby reducing the benefits of having the air layer; this could even allow the bearing surfaces to make contact during use which could cause physical wear thereto. Having too thick a spacer element reduces the stiffness of the bearing reducing the effectiveness of bearing operation.

The process of providing a spacer element 10 of suitable thickness will also greatly add to the complexity of bearing manufacture. In fact, all parts of the prior art bearing must be manufactured with a small tolerance to ensure the assembled bearing has the desired working gap. Furthermore, sandwiching a spacer element between rotor portions can introduce stresses and strains into the rotor portions which cause deformation of the shape of the bearing surface thereby decreasing the efficiency of bearing operation. These effects are especially apparent when forming bearings that are to be used in high accuracy apparatus, such as metrology apparatus.

Referring to FIG. 2, an illustration of a bearing 20 according to the present invention is given. The bearing 20 comprises a stator 22 and a rotor 24.

The rotor 24 comprises a shaft 26 having an end stop 28 and carries a first rotor portion 30 and a second rotor portion 32. The first rotor portion 30 and the second rotor portion 32 are annular and each have an inner threaded surface which mates with a corresponding thread formed on the outer surface of the shaft 26. The first and second rotor portions 30 and 32 are thus "screwed" onto the shaft 26 and retained in the required fixed space relation by a suitable glue (e.g. an epoxy).

The first and second rotor portions 30 and 32 comprise a first rotor bearing surface 34 and a second rotor bearing surface 36 respectively that extend outwardly from the shaft 26. The first and second rotor portions are located on the shaft 26 such that the first and second rotor bearing surfaces 34 and 36 face each other.

The stator 22 comprises first and second stator bearing surfaces 38 and 40 which are shaped to compliment the first and second rotor bearing surfaces 34 and 36 respectively. The stator 22 is located axially between the first and second rotor portions 30 and 32 such that the complimentary stator and rotor bearing surfaces are adjacent one another but separated by the required working gap. As outlined in more detail below, the working gap may be set as required during the process of screwing the second rotor portion 32 on to the shaft 26.

The stator 22 has a hollow core 42 and channels extending therefrom to the first and second stator bearing surfaces 38 and 40. Apertures 43 in the bearing surfaces thus permit air to flow from the hollow core 42 into the gap between the bearing surfaces. Apertures 44 are also formed in the shaft 26 to permit the air to flow into the core of the shaft 26. The shaft 26 also has an internal diameter that is sufficiently large to allow a motor (not shown) to be located therein. In such an arrangement, the air which flows through the bearing can also perform the additional function of cooling the motor.

Referring to FIG. 3, a more detailed perspective view of the bearing 20 described with reference to FIG. 2 is shown. In particular, FIG. 3 shows the stator 22 and the rotor 24. The rotor 24 comprises a rotor assembly 50 that forms the shaft 26 and the end stop 28 described above. In addition, a motor 52 is illustrated.

Referring to FIG. 4, a method of forming a bearing of the type shown in FIG. 3 is illustrated.

FIG. 4a shows the step of taking a rotor assembly 50 comprising a shaft 26 having threaded portions 54 formed on its external surfaces. The first (lower) rotor portion 30 is screwed onto the shaft 26 by rotating said portion 30 in the clockwise direction indicated by arrow 56. To minimise physical distortion of the first rotor portion 30, said portion is screwed onto the shaft 26 until it hits the end stop 28 whereupon a small counter-clockwise rotation may be performed to slightly disengage the first rotor portion from the end stop 28. Glue (e.g. epoxy) may be initially applied to a region of the threaded portion 54 such that the first rotor portion 30 becomes securely affixed to the shaft 26.

FIG. 4b shows the step of bringing the rotor assembly 50 having the first rotor portion 30 attached thereto into engagement with the stator 22. The stator is dimensioned such that it simply slides over the shaft 26 and rests in contact with the first rotor portion 30.

FIG. 4c illustrates the step of affixing the second rotor portion 32 to the rotor shaft 26. The second rotor portion 32 is screwed into place by rotation in the clockwise direction indicated by arrow 56.

To determine the location of the second rotor portion 32 relative to the shaft 26, air may be passed through the bearing structure via the cavity 42 and apertures 43 of the stator 22. The flow rate of air through the bearing may then be measured and the flow rate will depend on the working gap between the bearing surfaces of the stator and the rotor; i.e. as the working gap is reduced, the flow rate will reduce accordingly. Prior simulation and/or testing can provide an estimate of the optimum flow rate that is associated with the optimum working gap.

If the measured flow rate indicates the working gap is too large or too small, the air flow can be stopped and the bearing readjusted. The air flow can then be restarted and the flow rate measured again. This adjustment/measurement process can be repeated until the optimum flow rate is achieved. Each adjustment step may comprise rotating the second rotor portion 32 through a certain angle.

The above described method can be readily implemented during bearing manufacture; i.e. the second rotor portion 32 can simply be screwed onto the shaft 26 until a predetermined air flow rate is reached that provides the optimum working gap. Glue may again be applied to the thread 54 of the shaft prior to attachment of the second rotor portion 32 such that, when the ideal working distance has been set, the second rotor portion becomes securely attached to the shaft in the required position. The glue is preferably allowed to set whilst the bearing is activated (i.e. whilst the air flow is on).

The above method provides an effective means for ensuring the optimum bearing working gap is provided. In particular, it overcomes the need for providing precisely machined spacer elements or the like to space apart bearing surfaces. Furthermore, no precision measurements of working gap are required during the manufacturing process. Measuring the working gap whilst the bearing is operating also takes account of any compliance in the bearing structure or mountings etc. Bearings can thus be manufactured and set in this manner at a much lower cost than previously possible. The ability to produce bearing surfaces separately from the shaft to which they are subsequently attached also reduces the complexity of manufacture and allows high precision (e.g. lapping) techniques to be used to accurately shape the bearing surfaces.

The bearing surfaces of the stator and rotor illustrated with reference to FIGS. 2 to 4 above are concave and convex respectively. Furthermore, the radii of curvature of the complementary bearing surfaces are arranged such that a substantially constant air gap is provided when the bearing is set at the optimum working distance. Forming bearings using alternative bearing surfaces would, however, be possible.

FIG. 5 illustrates an alternative bearing 60. For clarity, the various air channels and aperture are omitted from the drawing.

The bearing 60 comprises a rotor 62 that comprises a shaft 64 having a first rotor portion 66 and a second rotor portion 68. The first rotor portion 66 is permanently attached to the shaft 64 and the second rotor portion 68 is attached to the shaft 64 via a screw-thread 70. The first rotor portion 66 has a first rotor bearing surface 72 that is substantially flat whilst the second rotor portion 68 has a second rotor bearing surface 74 that is convex.

A stator 76 is also provided that is axially located between the first and second rotor portions. The stator has a first stator bearing surface 78 which is flat and a second stator bearing surface 80 which is concave. The first and second rotor bearing surfaces are thus complementary to the associated first and second stator bearing surfaces respectively.

The bearing 60 can be set by adjusting the position of the second rotor portion 68 along the shaft 64 (i.e. by rotating the second rotor portion 68 relative to the shaft 64). For example, the bearing may be configured using a method analogous to that described above with reference to FIG. 4.

The examples provided above describe how the axial distance between two rotor portions can be adjusted to set the required bearing working gap. The skilled person would appreciate that the separation between the two bearing surfaces of the stator may alternatively, or additionally, be adjusted to provide a similar effect.

Referring to FIG. 6, a further bearing 80 is shown. The bearing 80 comprises a first rotor portion 82 and a second rotor portion 84 carried by a shaft 86. The first and second rotor portions 82 and 84 have first and second rotor bearing surfaces 86 and 88 formed on their facing surfaces. A stator 90 is also provided that comprises a first stator bearing surface 92 and a second stator bearing surface 94.

The first and second rotor surface 86 and 88 are complimentary to the respective first and second stator surfaces 92 and 94.

The stator is also arranged to comprise a stator bearing surface separation control means 96. The separation control means 96 is arranged to vary the distance between the first and second stator surfaces 92 and 94; i.e. the separation control means 96 allows the distance "x" shown in FIG. 6 to be varied. The separation control means 96 may comprise a joint between two stator portions; for example, the two stator portions may be joined via a screw thread or similar. Alternatively, both stator portions may be attached (e.g. screwed) to a support structure.

Although providing a screw thread or similar is a convenient way to adjust the separation of bearing surfaces, the skilled person would appreciate the numerous alternative ways in which a similar effect could be achieved.

Referring to FIG. 7, an alternative bearing 100 is illustrated. The bearing comprises a first rotor portion 102 spaced apart from a second rotor portion 104 by a spacer 106. Bearing surfaces 108 of the first and second rotor portions 102 and 104 are complimentary to bearing surfaces of an associated stator 110.

A first set of screws 112 are passed through the first rotor portion 102, the second rotor portion 104 and the spacer 106. Each screw 112 is tightened to hold the components in a stack. In addition, a further set of screws 114 are provided which protrude through the second rotor portion 104 and engage the spacer. It can be seen that tightening/loosening the screws 114 provides control over the separation between the bearing surfaces of the first and second rotor portions. In this manner, the working gap of the bearing can be set as required.

Although various bearing designs are illustrated above, a person skilled in the art would recognise the numerous variations and alternative designs that could be implemented in accordance with the present invention. It should also be remembered that the invention may be applied to many types of rotary bearing, including thrust bearings.

The invention claimed is:

1. A rotary gas bearing comprising a first part rotatable relative to a second part, the first part comprising;
   a support member;
   a first portion attached to the support member, the first portion comprising a first bearing surface; and
   a second portion attached to the support member, the second portion comprising a second bearing surface;
   wherein both the first portion and the second portion are attached to the support member by screw thread connections,
   the support member comprises a shaft having a substantially circular cross-section,
   the shaft comprises a hollow core, and
   a motor assembly is located, at least in part, within the hollow core of the shaft.

2. A bearing according to claim 1 wherein the first portion and the second portion are substantially annular and each comprise a central aperture having threaded walls for engaging a complimentary thread of the support member.

3. A bearing according to claim 1 comprising means for immobilising the first portion and the second portion relative to the support member.

4. A bearing according to claim 3 wherein adhesive is provided to fix the position of the first portion and the second portion relative to the support member.

5. A bearing according to claim 1 wherein the second part comprises one or more additional bearing surfaces complimentary to the first and second bearing surfaces of the first part.

6. A bearing according to claim 5 wherein the one or more additional bearing surfaces comprise at least one aperture through which gas can be passed.

7. A bearing according to claim 1 wherein at least one of the first bearing surface and the second bearing surface comprises at least one aperture through which gas can be passed.

8. A bearing according to claim 1, wherein the motor assembly is located at a position along the shaft that is midway between the first portion and the second portion.

9. A bearing according to claim 1, wherein at least some of the gas that passes between the bearing surfaces of the first part and the second part is routed to the motor assembly.

10. A bearing according to claim 1 wherein the first part forms a rotor and the second part forms a stator.

11. A bearing according to claim 1 wherein the first part forms a stator and the second part forms a rotor.

12. A bearing according to claim 1 wherein the first bearing surface has a convex shape or a concave shape.

13. A bearing according to claim 1 wherein the second bearing surface has a convex shape or a concave shape.

14. Metrology apparatus comprising a bearing according to claim 1.

* * * * *